United States Patent
Mella et al.

(10) Patent No.: US 11,841,277 B2
(45) Date of Patent: Dec. 12, 2023

(54) SKIN-POINT TEMPERATURE MEASUREMENT ASSEMBLY

(71) Applicant: Endress+Hauser Wetzer GmbH+Co. KG, Nesselwang (DE)

(72) Inventors: Stefano Mella, Novate (IT); Michele Conversano, Pessano con Bornago (IT)

(73) Assignee: Endress+Hauser Wetzer GmbH+Co. KG, Nesselwang (DE)

( * ) Notice: Subject to any disclaimer, the term of this patent is extended or adjusted under 35 U.S.C. 154(b) by 346 days.

(21) Appl. No.: 17/281,337

(22) PCT Filed: Sep. 5, 2019

(86) PCT No.: PCT/EP2019/073743
§ 371 (c)(1),
(2) Date: Mar. 30, 2021

(87) PCT Pub. No.: WO2020/069814
PCT Pub. Date: Apr. 9, 2020

(65) Prior Publication Data
US 2021/0396594 A1 Dec. 23, 2021

(30) Foreign Application Priority Data
Oct. 4, 2018 (EP) .................................... 18198608

(51) Int. Cl.
*G01K 1/143* (2021.01)
*G01K 13/00* (2021.01)
(Continued)

(52) U.S. Cl.
CPC ............... *G01K 1/143* (2013.01); *G01K 1/08* (2013.01); *G01K 7/00* (2013.01); *G01K 13/00* (2013.01)

(58) Field of Classification Search
CPC ............ G01K 1/143; G01K 1/08; G01K 7/00; G01K 13/00
See application file for complete search history.

(56) References Cited

U.S. PATENT DOCUMENTS 5,172,979 A * 12/1992 Barkley ................. H10N 10/17
374/E1.019
5,382,093 A    1/1995 Dutcher
(Continued)

FOREIGN PATENT DOCUMENTS

CN       107144365 A  *  9/2017
DE          4427181 A1 *  2/1996 ............. G01K 1/143
(Continued)

*Primary Examiner* — Mirellys Jagan
(74) *Attorney, Agent, or Firm* — Christopher R. Powers; Endress+Hauser (USA) Holding, Inc.

(57) ABSTRACT

A mounting assembly for mounting a measuring insert for determining and/or monitoring at least the temperature of a medium in/on a pipe or a vessel includes a holding member for accommodating said measuring insert, wherein said holding member a fastening means for detaching and fixing the measuring insert at a defined position relative to the pipe or vessel, and a shield unit for insulating at least said part of the measuring insert accommodated by said holding member against the environment. The shield unit is embodied so that it at least partially surrounds said holding member and said part of the measuring insert accommodated by said holding member, and includes an opening for receiving said measuring insert and a fastening unit for detaching and fixing said shield unit to the pipe or vessel.

13 Claims, 3 Drawing Sheets

(51) Int. Cl.
*G01K 1/08* (2021.01)
*G01K 7/00* (2006.01)

(56) References Cited

U.S. PATENT DOCUMENTS

| | | |
|---|---|---|
| 6,158,886 A | 12/2000 | Dutcher et al. |
| 2002/0064206 A1* | 5/2002 | Gysling ................ G01K 1/143 |
| | | 374/161 |
| 2004/0037350 A1 | 2/2004 | Parmicza et al. |
| 2007/0175266 A1* | 8/2007 | Harcourt ................ G01K 1/143 |
| | | 374/E1.019 |
| 2013/0070808 A1 | 3/2013 | Daily et al. |

FOREIGN PATENT DOCUMENTS

| | | | |
|---|---|---|---|
| DE | 4427181 A1 | 2/1996 | |
| DE | 102009007948 A1 * | 9/2010 | ............. F24D 19/10 |
| DE | 202012006982 U1 | 10/2012 | |
| DE | 102014118206 A1 | 6/2016 | |
| DE | 202016003218 U1 | 8/2016 | |
| DE | 102015113237 A1 | 2/2017 | |
| DE | 102021104758 A1 * | 9/2022 | |
| EP | 0754935 A1 * | 1/1997 | |
| FR | 2833346 A1 | 6/2003 | |
| JP | 563437 U | 1/1981 | |
| JP | 2010175373 A | 8/2010 | |
| JP | 3213665 U | 11/2017 | |
| KR | 20200122787 A * | 10/2020 | |

\* cited by examiner

SKIN-POINT TEMPERATURE MEASUREMENT ASSEMBLY

CROSS-REFERENCE TO RELATED APPLICATIONS

The present application is related to and claims the priority benefit of European Patent Application No. EP 18198608.4, filed on Oct. 4, 2018, and International Patent Application No. PCT/EP2019/073743, filed on Sep. 5, 2019, the entire contents of which are incorporated herein by reference.

TECHNICAL FIELD

The present invention is concerned with a mounting assembly for mounting a measuring insert for determining and/or monitoring at least the temperature of a medium in/on a pipe or a vessel. The present invention is further concerned with a measuring device for determining and/or monitoring at least the temperature of a medium in/on a pipe or vessel. The measuring insert preferably comprises at least one sensing element for determining and/or monitoring the temperature, e.g., a thermocouple or a resistive element. The measuring device in turn is, for example, a thermometer, for example, a thermometer in automation technology.

BACKGROUND

Thermometers have become known from the state of the art in a wide variety of designs. For example, there are thermometers that use the expansion of a liquid, a gas or a solid with a known coefficient of expansion to measure the temperature. Other thermometers associate the electrical conductivity of a material with the temperature, for example, when resistance elements or thermocouples are used. Pyrometers, on the other hand, use the heat radiation of a substance to determine its temperature. The respective underlying measuring principles have each been described in a large number of publications.

A temperature sensor in the form of a so-called thin-film sensor, in particular a resistance temperature detector (RTD), for example, uses a sensor element provided with connecting wires and applied to a carrier substrate, whereby the rear side of the carrier substrate is usually metallically coated. The sensor elements used are so-called resistor elements, which are given, for example, by platinum elements, which are also commercially available as PT10, PT100 and PT1000 elements.

In the case of a thermocouple in turn the temperature is determined by means of a thermoelectric voltage occurring between the thermocouple wires connected at one end and consisting of different materials. For temperature measurement, commonly thermocouples according to DIN standard IES584, for example, thermocouples of type K, J, N, S, R, B, T, or E, are used as temperature sensors. But other material pairs, for example, those with a measurable Seebeck effect, are also possible.

The measuring accuracy of a thermometer is highly dependent on thermal couplings between the respective medium, the process environment and/or the thermometer. In this manner, the prevailing heat flows play a decisive role. For instance, a reliable determination of the temperature thereby requires that the thermometer and the medium are in thermal equilibrium for at least a period of time required to determine the temperature. At least for this period of time the temperature of the thermometer and that of the medium therefore should be ideally essentially the same.

The reaction of a thermometer to a change in temperature, i.e., the so-called response time of the thermometer, plays a decisive role here, especially if the temperature of the medium changes substantially continuously. Depending on the specific design of the thermometer, its installation and depending on the respective application, various problems can arise in this respect.

On the one hand, thermometers are known in which the sensor element is brought more or less directly into contact with the respective medium. These have a comparatively good coupling between the medium and the sensor element. Alternatively, however, thermometers are often designed in such a way that they can be attached from the outside/inside to the respective container in which the medium is contained. Such devices, also known as surface or skin-point thermometers, have become known from documents such as DE102014118206A1 or DE102015113237A1. With such thermometers, the sensor elements are advantageously not in contact with the process. However, various additional aspects must be taken into account for a good thermal coupling. For example, the mechanical, and thus also the thermal contact, between the vessel and the thermometer is decisive for the achievable measuring accuracy. If there is insufficient contact, an exact temperature determination is not possible.

For the various applications that require using a surface or skin-point measuring device, frequently measuring inserts having sensing elements in the form of thermocouples are used, which thermocouples are directly welded on the outer surface or skin of the pipe or vessel. However, in such cases, replacement of the thermocouples might become a time consuming and expensive process, in particular, because a replacement may require a temporary shutdown of the process and/or application.

To overcome these drawbacks, it has become known from U.S. Pat. No. 5,382,093 to use a receptacle for a sheathed thermocouple comprising a curved tube carrying a slotted part at one end and being secured to a conduit whose temperature is to be measured. The sheathed thermocouple can be removably inserted into the tube allowing for straightforward installation and replacement of the thermocouple used for the surface or skin temperature measurement.

SUMMARY

Given on the known solutions, it is an object of the present invention to provide a possibility for surface or skin temperature measurement which allows for easy implementation and replacement of the measuring insert.

This object is achieved by the mounting assembly and by the measuring device according to the present disclosure.

With respect to the mounting assembly, the object underlying the present invention is achieved by means of a mounting assembly for mounting a measuring insert for determining and/or monitoring at least the temperature of a medium in/on a pipe or a vessel. The mounting assembly at least comprises a holding member for accommodating said measuring insert, wherein said holding member comprises at least one fastening means for detaching and fixing at least a part of the measuring insert at a defined position relative to the pipe or vessel. The mounting assembly further comprises a shield unit for insulating at least said part of the measuring insert accommodated by said holding member against the environment, which shield unit is embodied so that it at least partially surrounds said holding member and said part of the measuring insert accommodated by said holding member. The shield unit thereby at least comprises at least one opening for receiving said measuring insert, and at least one fastening unit for detaching and fixing said shield unit to the pipe or vessel.

By means of the mounting assembly according to the present invention, the measuring insert can be especially mounted on an outer wall of a pipe or vessel allowing for surface or skin-point temperature measurement with high precision.

The holding member serves for a detachable fastening of the measuring insert at/on the pipe or vessel. Replacement of the measuring insert thereby becomes possible in a straight-forward manner.

The shielding unit in turn serves for a thermal shielding against the environment. The ambient or environmental temperature usually differs from the process temperature. This results in a temperature gradient from the medium via the wall of the pipe or vessel to the measuring insert.

The measuring insert on the one hand is in thermal contact with the pipe or vessel and on the other hand is exposed to the ambient or environmental temperature. In this manner, a thermal equilibrium at least for the time period in which measured values are recorded by the thermometer, is difficult to achieve. By means of the shielding unit measurement uncertainties or deviations due to the special situation associated with surface or skin-point temperature measuring devices are highly reduced. In particular, a heat flow from the measuring insert can be reduced resulting in an increased measuring accuracy of the measuring insert.

In one embodiment of the mounting assembly, said shield unit is embodied so, that in case it is attached to the wall of the pipe or vessel, defines an inner volume in which the holding member and at least said part of the measuring insert accommodated by said holding member are located. The inner volume may, e.g., be defined by the shielding unit and by a part of the wall of the vessel or pipe and the shielding unit.

In one embodiment, said fastening unit comprises at least one clip, a clamp, a two-half clamp or a clamp ring, a weld or a tie wrap for detaching and fixing said shield unit to the pipe or vessel.

In a preferred embodiment said shield unit is built by at least one shield element, which is embodied so, that in case it is fastened to said wall of the pipe or vessel, it defines an inner volume in which the holding member and at least said part of the measuring insert accommodated by said holding member are located. In case the shield unit comprises one shield element only, it is of advantage, if the shield element defines the volume together with at least a part of the wall or pipe to which it is fastened. In case the shield unit comprises more than one shield element in turn, it is of advantage, if the at least two shield elements define the volume. However, it is also possible that the at least two shield elements define the volume together with at least the part of the wall or pipe to which the shield unit is fastened.

If more than one shield element is used, at least two of the shield elements may at least partially be embodied so, that they are complementary to each other.

With regards to the shield unit one embodiment includes that the shield unit comprises at least two shield elements, wherein said fastening unit serves for connecting the two shield elements and for detaching and fixing said shield unit to the pipe or vessel. In this case, the fastening unit serves for both, connecting the shield elements and for detaching and fixing the shield unit to the pipe or vessel. Alternatively, the at least two shield elements are detachably connected with each other by means of at least one connecting means.

It is further of advantage, if the first shield element is fixedly connected to the wall of the pipe or vessel, e.g., by means of a weld or soldering. The holding unit in such case, may e.g. be located directly at/on the wall of the pipe or vessel, or it may be connected to the shielding unit, for example, to the first shield element.

Regarding the connecting means it is of advantage, if the connecting means at least comprises a hinge, a bolting, a click mechanism, a weld or a soldering.

In a preferred embodiment of the mounting assembly, the mounting assembly further comprises a thermal insulation element, which in particular is introducible into said inner volume defined by the shield unit, and which thermal insulation element serves for a thermal insulation of at least said part of the measuring insert accommodated in said holding unit.

In another preferred embodiment of the mounting assembly, said holding unit is embodied in the form of an elongated body which has an inner volume for accommodating the measuring insert.

In still another preferred embodiment of the mounting assembly, said fastening means of the holding unit comprises a screw or a pushing element, which screw or pushing element serves for detaching and fixing at least a part of the measuring insert in said holding unit. The embodiments of the holding unit and fastening unit are preferably matched to each other. For instance, at least one wall of the holding unit may comprise at least one bore for receiving at least one component of said fastening unit.

Regarding the holding unit, it is of advantage, if the holding unit comprises an annular clamping element with adjustable diameter which serves for detaching and fixing at least a part of the measuring insert at a defined position relative to the pipe or vessel.

The object underlying the present invention is also achieved by means of a measuring device for determining and/or monitoring at least the temperature of a medium in/on a pipe or vessel, at least comprising a measuring insert having at least one sensing element for determining and/or monitoring the temperature, and a mounting assembly according to at least one of the embodiments of the mounting assembly described in connection with the present invention.

The measuring device may further comprise a measuring transducer which may be arranged with the measuring insert or separated by the measuring insert. The transducer preferably serves for processing at least the temperature of the medium determined by the measuring insert.

Regarding the measuring insert, it is of advantage, if said sensing element is a thermocouple or a resistive element. The measuring insert may e.g. at least partially be arranged in a protective tube surrounding and protecting the measuring insert.

In one embodiment of the measuring device, the mounting assembly serves for mounting said measuring insert on/at an outer wall of the pipe or vessel. Thus, the measuring device serves for sensing the surface or skin-point temperature of the medium contained in the pipe or vessel.

It shall be noted that the embodiments described in connection with the mounting assembly are mutatis mutandis also applicable in connection with the measuring device and vice versa.

BRIEF DESCRIPTION OF THE DRAWINGS

In the following, the present invention will be explained in greater detail based on the drawings presented in FIGS. 1-3.

In the figures, identical elements are always provided with the same reference sign.

DETAILED DESCRIPTION

Although all figures shown refer to the case of a skin-point thermometer for a pipe 2, the inventive arrangement can also be used for a vessel or container. This invention is therefore by no means limited to pipes. Similarly, this invention is as well by no means limited to thermocouples, even though all figures relate to a measuring insert 3 in the form of a thermocouple.

Figure 1:
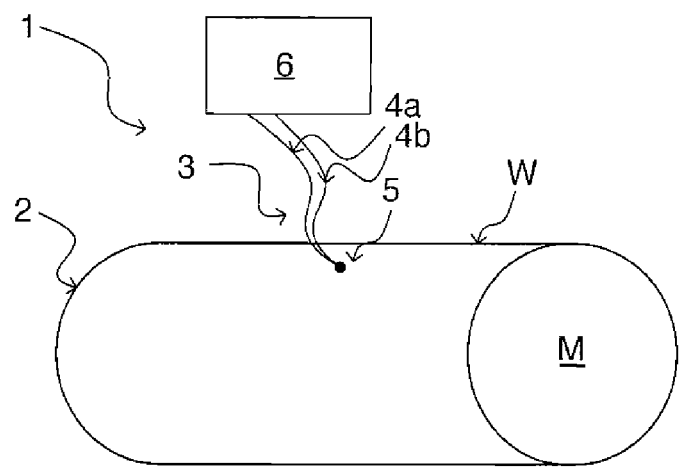
FIG. 1 shows a surface temperature measuring probe according to the state of the art.

FIG. 1 shows a surface temperature measuring device 1 which serves for determining and/or monitoring the temperature of medium M in pipe 2. The device 1 comprises measuring insert 3 and electronics 6 which serve, e.g., for energy supply and signal processing. The measuring insert 3 is embodied in the form of a thermocouple with two thermocouple wires 4a and 4b which are connected to each other on the wall W of the pipe 2 at a connection point 5, also called a hot junction. The thermocouple wires 4a and 4b are directly welded on the wall W which makes installation and replacement rather difficult.

To facilitate implementation and replacement of the measuring insert 3 of a surface temperature measuring device 1, the present invention suggests a mounting assembly 7 according to the present disclosure.

Figure 2:
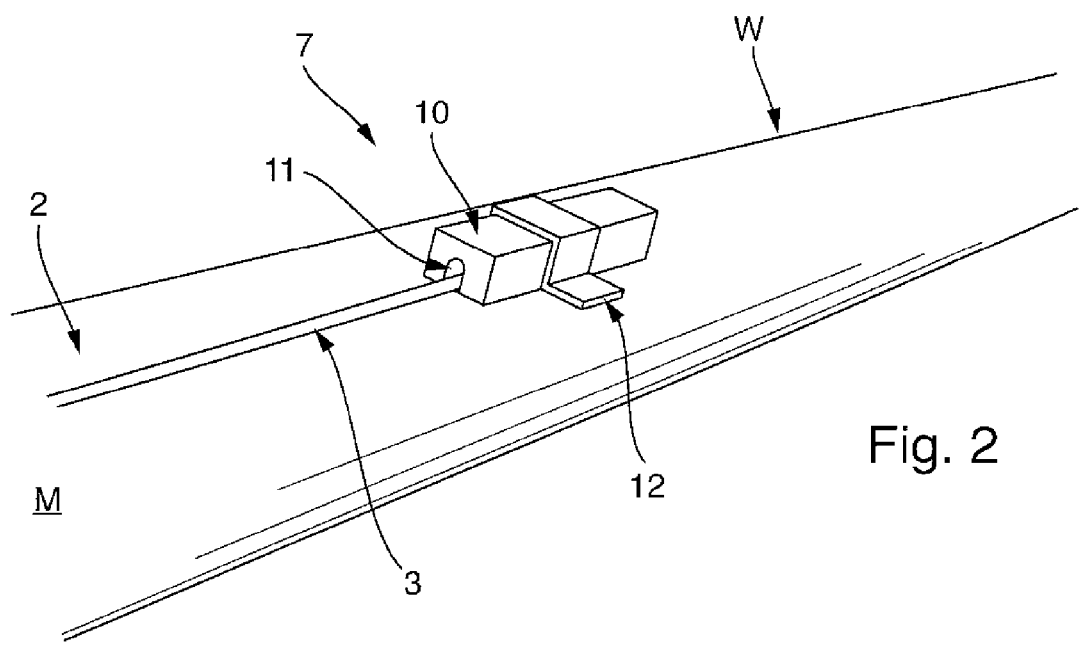
FIG. 2 shows a first embodiment of a mounting assembly according to the present disclosure with a one-piece shield unit.

A first exemplary embodiment of a mounting assembly 7 is shown in FIG. 2. Mounting assembly 7 comprises a holding member 8 (not shown in FIG. 2) and a one-piece shield unit 10. The measuring insert 3 is introduced into an inner volume V (not visible in FIG. 2) of the shield unit 10 through opening 11, whereas the volume V is at least partially defined by the geometry and arrangement of the shield unit 10. The shield unit 10 is fixed on the wall W of pipe 2 by means of fastening unit 12, which may, e.g., by welded to the wall W. However, also other methods of attachment of the fastening unit 12 to the pipe or vessel 2, which are known to those skilled in the art, do fall under the scope of the present invention.

Figure 3:
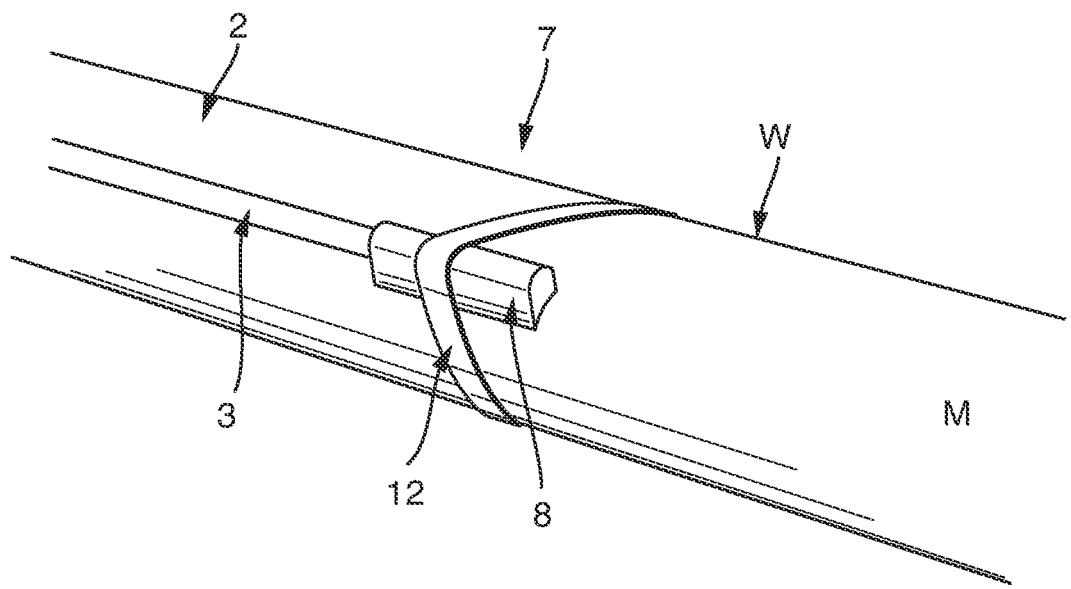
FIG. 3 shows a first embodiment of a mounting assembly according to the present disclosure with a shield element.

A second embodiment of a mounting assembly 7 with a one-piece holding member 8 is shown in FIG. 3. FIG. 3 differs from FIG. 2 in that the fastening unit 12 has the form of a clamp ring. Reference signs already described in connection with previously described embodiments are not mentioned here again.

Figure 4:
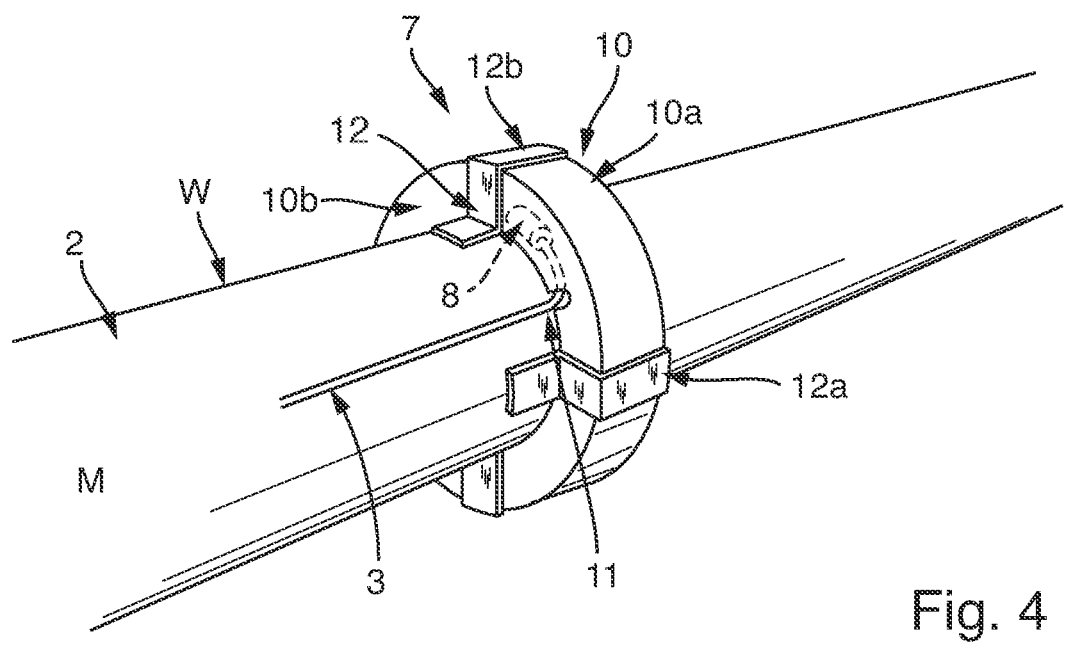
FIG. 4 shows a second embodiment of a mounting assembly according to the present disclosure with a shield unit having two shield elements.

For the embodiment shown in FIG. 4 in turn, the shield unit 10 comprises two shield elements 10a and 10b, which are complementary to each other and constructed in the form of two half shields adjusted to the diameter of pipe 2. One of the shield elements 10a comprises an opening 11 for receiving the measuring insert 3. The mounting assembly also includes a holding member 8 (shown in dotted lines in FIG. 4). The fastening unit 12 in turn comprises four clips 12a-12d (only two are visible in FIG. 4), wherein each clip is embodied similar as in the case of FIG. 2. The fastening unit 12 serves for connecting the two shield elements 10a and 10b with each other. At the same time, it serves for fixing the shield unit to pipe 2.

Figure 5:
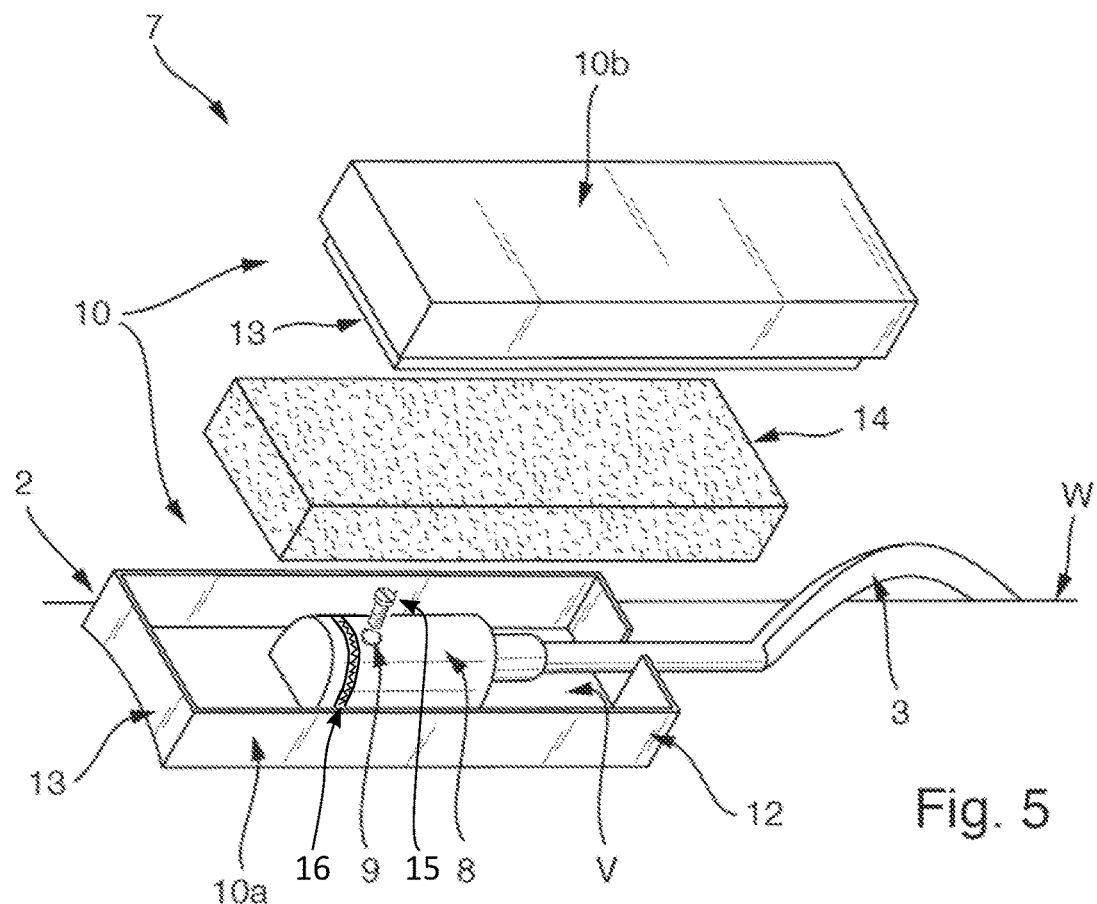
FIG. 5 shows a third embodiment of a mounting assembly according to the present disclosure with a shield unit having two shield elements.

In FIG. 5 the shield unit 10 also comprises two shield elements 10a and 10b. In contrast to FIG. 4 the two shield elements 10a and 10b have the form of two rectangular half shields forming a cuboid when connected to each other. A first shield element 10a is fixedly connected to pipe 2. In this case, the fastening unit 12 comprises a weld. The second shield element 10b is detachably connectable to the first shield element 10a by means of connecting means 13 which comprises a click mechanism.

The shield elements 10a and 10b define, when connected, the inner volume V in which holding member 8 is arranged. Holding member 8 serves for accommodating at least a part of the measuring insert 3. Here, the measuring insert 3 comprises a thermocouple. In such case, the hot junction of the thermocouple is preferably located inside the holding unit 8 after installation of the mounting assembly 7. The holding member 8 has the form of an elongated body having an inner volume for accommodating the measuring insert 3. The measuring insert 3 thereby is secured inside the holding member 8 by means of fastening means 9 which comprises a screw. It shall be noted, that the holding member 8 and fastening means 9 also may be embodied differently while still falling under the scope of the present invention.

Independently of the embodiment, the holding member 8 and fastening means 9 serve for detachably fixing at least a part of the measuring insert 3 at a defined position relative to the pipe or vessel 2. It is of importance to provide a good thermal contact between the measuring insert 3 and medium M. Therefore, the measuring insert 3 is preferably in direct contact with the wall W of the pipe, or with a part of the shield unit 10, which is in direct contact with wall Was, e.g., in case of the embodiment shown in FIG. 5.

The mounting assembly 7 shown in FIG. 5 further comprises a thermal insulation element 14. The thermal insulation element 14 can be introduced into the inner volume V defined by the shield unit 10. Such element 14 serves for additional thermal insulation of the measuring insert 3.

Figure 6:
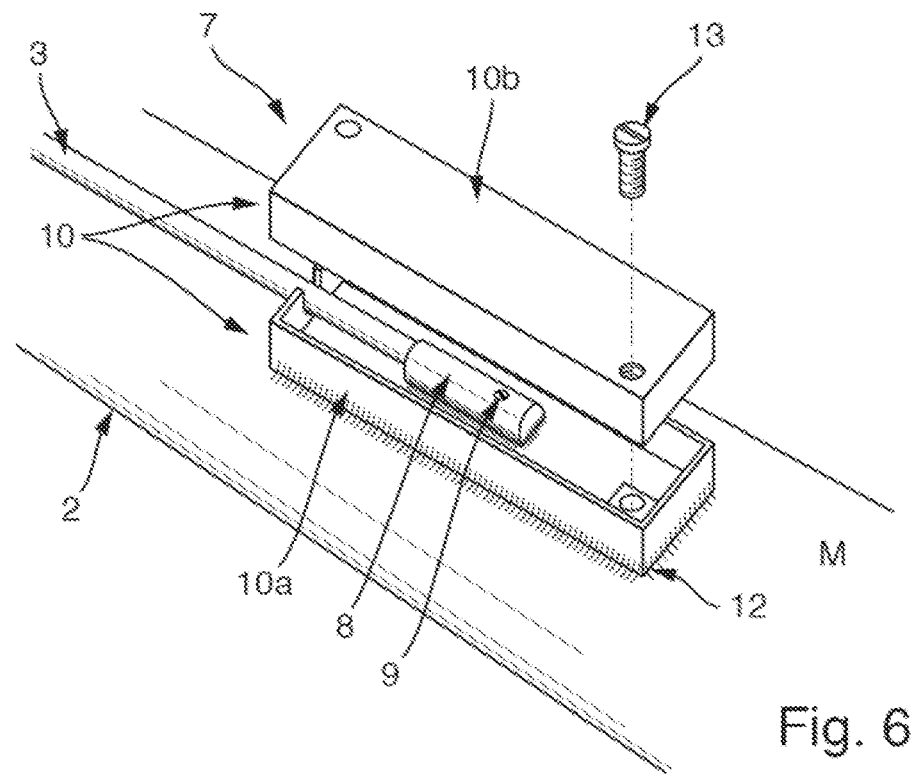
FIG. 6 shows a fourth embodiment of a mounting assembly according to the present disclosure with a shield unit having two shield elements.

The embodiment of the mounting assembly 7 shown in FIG. 6 finally differs from that shown in FIG. 5 in that the connecting means 13 comprise screws.

The various embodiments shown in FIGS. 2-6 may also be combined with each other in a different manner. It shall also be noted, that all figures shown are to be understood only as possible examples of selected embodiments. It goes without saying that in addition to those shown, numerous other embodiments are conceivable and fall under the present invention.

Patent Claims:

1. A mounting assembly for mounting a measuring insert configured to determine and/or monitor at least a temperature of a medium in a pipe or a vessel, the mounting assembly comprising:
a holding member configured to accommodate the measuring insert and to enable a detachable fastening of the measuring insert, wherein the holding member comprises a fastening means adapted to reversibly detach and fix at least a part of the measuring insert at a defined position relative to the pipe or vessel; and a shield unit configured to insulate at least the part of the measuring insert against an environment when accommodated by the holding member, the shield unit configured as to at least partially surround the holding member and the part of the measuring insert, wherein the shield unit includes an opening adapted to receive the measuring insert and a fastening unit adapted to reversibly detach and fix the shield unit to the pipe or vessel, wherein the fastening means of the holding member comprises at least one of a screw, a pushing element and an annular clamping element having an adjustable diameter, the annular clamping element being configured to enable reversibly detaching and fixing at least a part of the measuring insert at a defined position relative to the pipe or vessel.

2. The mounting assembly of claim 1, wherein the shield unit is configured as to, when attached to a wall of the pipe or vessel, define an inner volume in which the holding member and at least the part of the measuring insert accommodated by the holding member are disposed.

3. The mounting assembly of claim 1, wherein the fastening unit comprises a clip, a clamp, a two-half clamp, a clamp ring, a weld or a tie wrap adapted to reversibly attach the shield unit to the pipe or vessel.

4. The mounting assembly of claim 1, wherein the holding member is embodied with an elongated body, which defines an inner volume for accommodating the measuring insert.

5. The mounting assembly of claim 1, wherein the shield unit includes by at least one shield element configured as to, when attached to a wall of the pipe or vessel, define an inner volume in which the holding member and at least the part of the measuring insert accommodated by the holding member are disposed.

6. The mounting assembly of claim 5, further comprising a thermal insulation element, which is introducible into the inner volume defined by the shield unit, wherein the thermal insulation element is configured to thermally insulate at least the part of the measuring insert accommodated by the holding member.

7. The mounting assembly of claim 5, wherein the at least one shield element includes at least two shield elements, and wherein the fastening unit is configured to connect the at least two shield elements and to reversibly attach the shield unit to the pipe or vessel, or wherein the at least two shield elements are detachably connected with each other by a connector.

8. The mounting assembly of claim 7, wherein the connector comprises a hinge, a bolting, a click mechanism, a weld or a soldering.

9. The mounting assembly of claim 5, wherein the at least one shield element includes at least two shield elements, and wherein a first shield element of the at least two shield elements is embodied so as to be attached to the wall of the vessel or pipe.

10. The mounting assembly of claim 9, wherein the first shield element is fixedly connected to the wall of the pipe or vessel.

11. A measuring device for determining and/or monitoring at least a temperature of a medium in a pipe or vessel, the measuring device comprising:

a measuring insert including at least one sensing element configured to determine and/or monitor the temperature; and a mounting assembly according to claim 1.

12. The measuring device of claim 11, wherein the sensing element is a thermocouple or a resistive element.

13. The measuring device of claim 11, wherein the mounting assembly is configured to mount the measuring insert on/at an outer wall of the vessel or pipe.

* * * * *